April 4, 1944.   G. H. SMITH   2,345,688
METHOD AND APPARATUS FOR CUTTING FERROUS METAL BAR STOCK
Original Filed Nov. 7, 1939   2 Sheets-Sheet 2
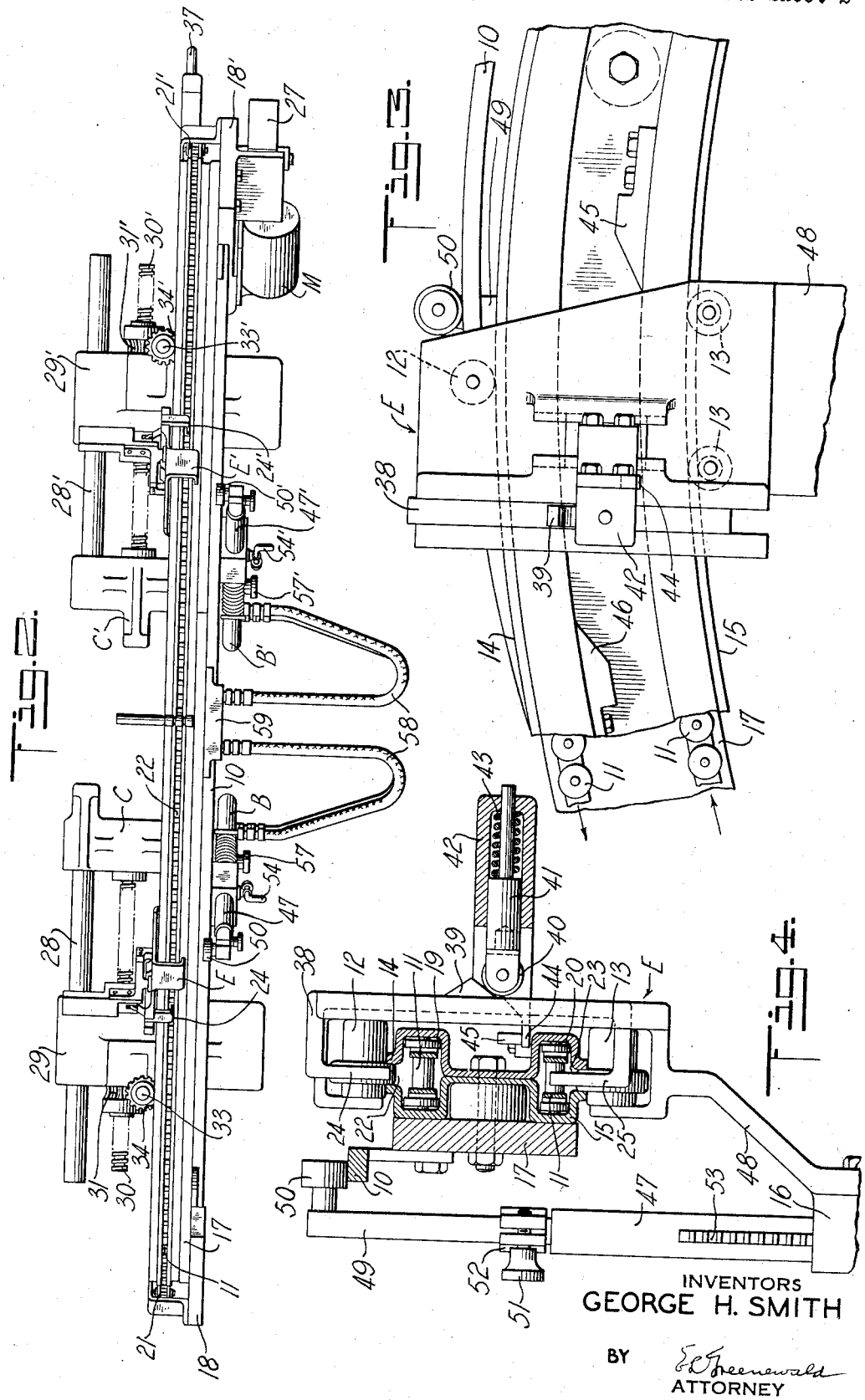
INVENTORS
GEORGE H. SMITH
BY E. L. Greenewald
ATTORNEY Patented Apr. 4, 1944

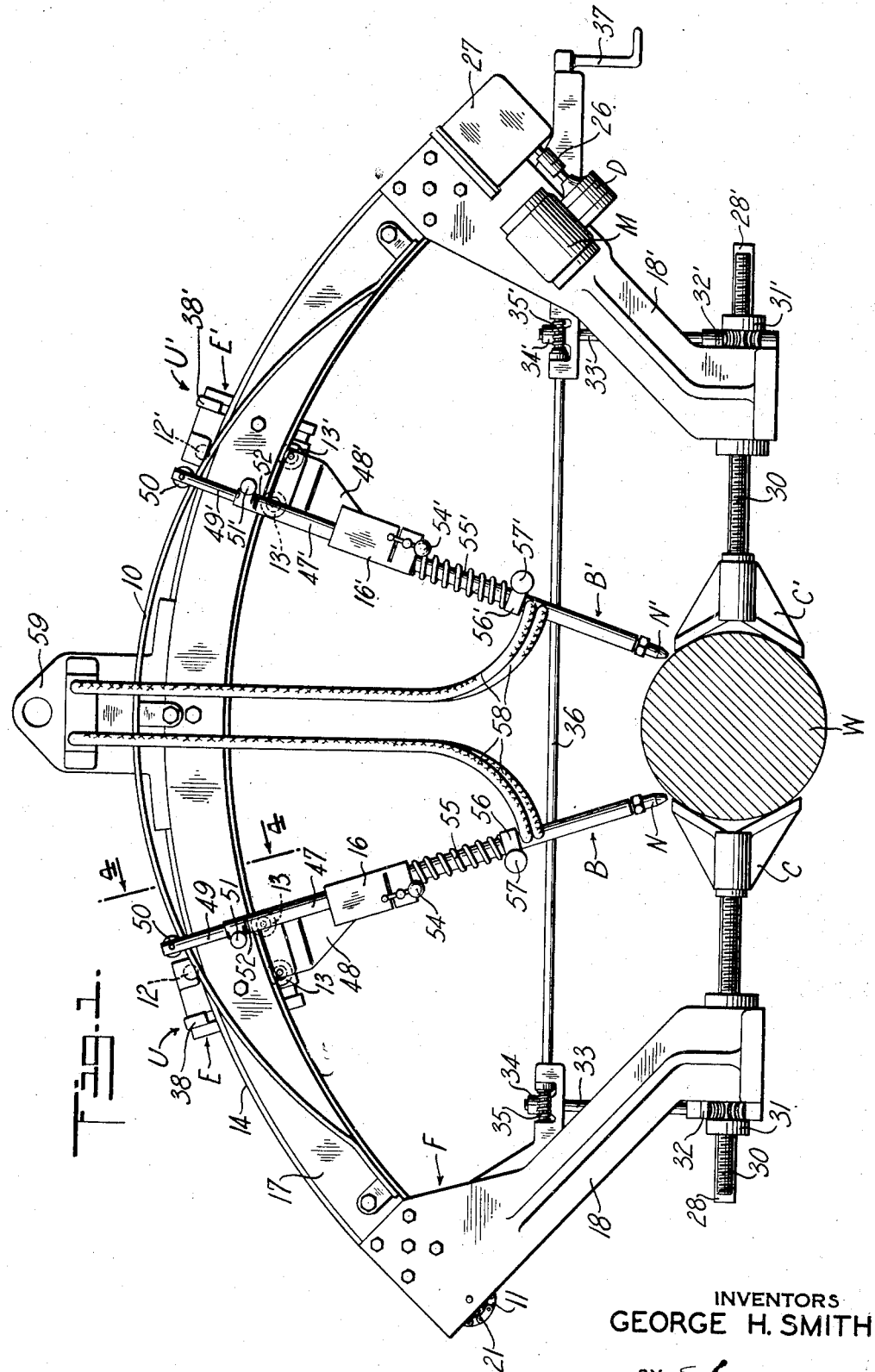

2,345,688

UNITED STATES PATENT OFFICE 2,345,688

METHOD AND APPARATUS FOR CUTTING FERROUS METAL BAR STOCK

George H. Smith, Buffalo, N. Y., assignor to The Linde Air Products Company, a corporation of Ohio Original application November 7, 1939, Serial No. 303,188. Divided and this application November 14, 1941, Serial No. 419,078

20 Claims. (Cl. 148—9)

The invention relates to the art of thermo-chemically cutting metals and more particularly to a method of rapidly and efficiently cutting ferrous metal bar stock such as round or rectangular steel billets by means of gas-cutting blowpipes and to novel apparatus for practicing such method.

Gas-cutting blowpipes, particularly those of the oxyacetylene type, provide an efficient means for cutting metal stock and in steel mills it has been proposed to use such means for removing scrap ends from billets or blooms, and for cutting heavy rounds or other shapes to predetermined lengths. In such applications the blowpipe may be manually guided across the work during the cutting operation, or it may be caused to traverse the work by means of a suitable apparatus either automatically or semi-automatically controlled.

Prior apparatus adapted for severing round bars and comprising a gas-cutting blowpipe and means automatically or semi-automatically controlled to impart arcuate motion to said blowpipe across the bar, in general, have relied on a method of cutting in which the position of the blowpipe, with respect to the vertical axis of the work, remains substantially parallel as the blowpipe traverses the work. In cutting operations employing such a method, it is desirable to decrease the rate at which the blowpipe traverses the work as the thickness of the work increases, in order to compensate for the difference in degree of oxidation and cutting action which occurs between the gases at the upper or entrant portion of the kerf and those at the lower or emergent portion and which causes the bottom of the kerf to proceed at a slower rate than the top.

According to the invention the time required for making a cut is substantially reduced by so controlling the angle of the blowpipe with respect to the vertical direction during the cut that the cutting action occurring nearest the nozzle is effected faster than the cutting action at the bottom of the kerf. When cutting a round section, the blowpipe axis is given a motion that is the reverse of a pendulum swing and such method of cutting may be termed the metronome or wiping method. The time required for severing a metal body is also reduced by employing more than one blowpipe simultaneously, for example, two blowpipes may be employed for starting the cut at each lateral edge of the body. The movement of the two blowpipes toward each other from each edge is so controlled that when the blowpipes approach each other near the center of the body, one of the blowpipes is caused to stop cutting and reverse its movement and the other blowpipe completes the kerf.

A principal object of the present invention is to provide a method of and an apparatus for decreasing the time required for thermo-chemically severing ferrous metal bodies, particularly bodies of similar width and thickness.

Other objects of the invention are to provide a method of thermo-chemically severing metal bars, and the like, whereby the cutting action is advanced at the most efficient rate in each portion of the kerf; to provide a method whereby a plurality of blowpipes may operate simultaneously for producing a single kerf; to provide apparatus adapted for practicing such method; to provide such apparatus comprising means for causing a gas-cutting blowpipe to traverse the article to be cut, and means for varying the angular position of the blowpipe during its travel; to provide such apparatus including means for reversing the direction of travel of a cutting blowpipe when said blowpipe reaches a predetermined point in its travel; and to provide an apparatus whereby the cutting operation may be automatically or semi-automatically controlled.

The manner in which this invention attains these and other objects will be apparent from the following description and the accompanying drawings in which:

Fig. 1 is a front elevational view of a preferred embodiment of the invention;

Fig. 2 is a plan view of the apparatus shown in Fig. 1;

Fig. 3 is a fragmentary rear view on an enlarged scale of a portion of the apparatus showing certain details of the track and a carriage; and Fig. 4 is a view on an enlarged scale of a section taken on the line 4—4 of Fig. 1 showing details of the track and carriage.

The present invention is based on a method of blowpipe cutting which comprises heating a portion of the metal stock to its ignition temperature, directing a jet of oxidizing gas onto said heated portion to start a kerf therethrough, progressively moving said jet across the stock, and continuously changing the angle at which said jet strikes the stock during such movement. More specifically, during the travel of a gas-cutting blowpipe across the work, the angle included between the blowpipe and the vertical axis of the work is decreased as the blowpipe approaches the vertical axis. This change may take substantially the form of the swing of an inverted pendulum assuming the point of suspension below the work. The desired result is that the upper portion of the cut or the portion nearest the cutting jet, progresses at a faster rate than the bottom portion of the cut.

An explanation of the improved cutting action obtained by the method herein described may be deduced from the following considerations:

1. The oxygen entering the kerf has its highest purity near the cutting nozzle, and the purity decreases as the oxygen progresses to the emergent portion of the kerf.
2. The film resistance tending to retard oxidation is least near the top of the kerf, the amount of slag increasing as the depth.
3. The oxygen velocity is highest near the top of the cut.
4. There is less turbulent action in the oxygen stream near the top of the cut.
5. The oxygen density is highest near the top of the kerf, since the oxygen stream is heated as it passes down into the kerf.

For most efficient cutting, therefore, the upper portion of the cut should progress faster than the lower portion.

In the preferred embodiment of the method and apparatus described herein two cutting units are employed, each propelled during the cutting operation in a common plane, but in opposite directions, toward the vertical axis of the work. In order to remove completely the metal from the center of the cut, one of the cutting units is carried past the vertical axis. To accomplish this, a reversing mechanism is provided which is adapted to reverse the direction of one cutting unit at a predetermined point in its line of travel. Thus, one of the cutting units travels almost to the vertical axis of the work, and then its direction of travel is reversed, while the other cutting unit is carried past the vertical axis to complete the cut.

Referring to Figs. 1 to 4, inclusive, the particular embodiment of the cutting apparatus shown comprises right-hand and left-hand cutting units U and U'. Each such unit includes an oxyacetylene blowpipe B or B' and a movable carriage E or E' by which the blowpipe is adjustably carried. A frame F supports both of the carriages E and E' in proper relation to the work W. A templet 10 mounted on the frame F controls the axial motions of the blowpipes B and B'. Motion is imparted to the carriages E and E' by a motor M acting through a speed-reduction unit D and an endless chain 11. The carriages E and E' are guided in their travel by an upper roller 12 and 12', respectively, which run on tracks 14 of the frame F, and two lower rollers 13 and 13', respectively, which run on tracks 15 of the frame F. The tracks 14 have a center of curvature located on the side of the work W opposite that across which the blowpipes move. To control the direction of travel of the carriages E and E', the carriages are adapted to engage either the upper or lower links of the endless chain 11 as desired. The blowpipes B and B' are slidably mounted on blowpipe holders 16 and 16' which are attached to the carriages E and E', respectively, and are automatically raised or lowered by the templet 10, and their successive angular positions with respect to the work W are controlled by the curvature of the tracks 14 and 15.

The frame F of the apparatus includes an upper arcuate member 17 and two downwardly projecting members 18 and 18' each rigidly fastened at their upper ends to an extremity of the upper member 17. Bolted to the back of the upper member 17 (Fig. 4) are the two track members 14 and 15 so shaped that, fastened side by side, an upper channel 19 and a lower channel 20 are formed. The channels 19 and 20 provide a means for guiding the endless chain 11 which meshes with sprockets 21 and 21' mounted respectively at the extremities of the upper member 17. The members 14 and 15 are also so shaped that longitudinal slots 22 and 23 are provided along the top and bottom of said members through which fingers 24 and 25 of the carriages E and E' may project, the edges of the slots 22 and 23 forming track surfaces for the rollers 12 and 13 of the carriages E and E'.

The endless chain 11 is actuated by the motor M and gear reduction unit D through a shaft 26 and bevel gears (not shown) within a housing 27 and connected to the right-hand sprocket 21'. The motor M, gear reduction unit D, and housing 27 are preferably mounted on the right-hand downwardly projecting member 18' of the frame F.

Two clamp blocks C and C' (Figs. 1 and 2) are provided to hold the work in position. Such blocks are preferably of the V-type and are so shaped that one clamp block C makes contact with the work at four points on the surface of the work and the other clamp block C' makes contact with the work at two points centrally located with respect to the four points contacted by the clamp C. Clamps so shaped and positioned are therefore self-centering and self-aligning. The guiding and adjusting means for each clamp block are substantially the same; accordingly, only the mechanism actuating one clamp block C will be described in detail. The clamp block C is held in a position with its contact surfaces substantially parallel to the work W by a guide rod 28 slidably mounted in ways 29 in the lower extremity of the downwardly projecting member 18. Lateral motion necessary to tighten the clamp against the work is imparted to the clamp block C by rotation of an internally threaded worm gear 31 which meshes with the non-rotating screw 30, the inward end of which contacts the clamp block C. To rotate the internally threaded worm gear 31 and therefore feed the screw 30 inwardly, a worm 32 which meshes with the worm gear 31 is mounted on the lower end of a vertical shaft 33. A second gear 34 is rigidly fastened to the upper extremity of the vertical shaft 33 and meshes with a second worm 35 mounted on a horizontal connecting shaft 36. The worm gear 34, the worm 35, and shafts 33 and 36 are supported and journalled by means of suitable bearings rigidly fastened to the inwardly projecting member 18. The shaft 36 which simultaneously controls the lateral movements of the clamp blocks C and C' toward or away from each other, may be rotated by means of a crank 37 secured to the right-hand end thereof.

The two cutting units are substantially the same in construction and therefore only the left-hand cutting unit will be described in detail. The carriage E comprises a C-shaped frame adapted to travel on the track by the rollers 12 and 13, there being two rollers 13 which have flanges entering the slot 23 to be guided along the underside of the upper frame member 17 and one roller 12 which is guided by its flange portion in the upper slot 22. To impart motion from the endless chain 11, which continually moves in one direction during the cutting operation, to the carriage E, a vertical slide bar 38 is mounted against the rear of the carriage E in a vertical groove and engages either the upper or the lower run of the chain by means of pawls or fingers 24 and 25 rigidly fastened to the upper and lower extremities, respectively, of the vertical slide 38 so as to project through the slots 22 and 23. The direction of motion imparted to the carriage E by the chain 11 is thus dependent on whether the upper finger 24 or the lower finger 25 engages the chain. For example, referring to Figs. 1 and 4, if the sprocket 21 is traveling in a clockwise direction, the left-hand cutting unit U will travel to the right if the upper pawl 24 engages the top links of the chain 11, and to the left if the lower pawl 25 engages the bottom links of the chain. By forcing the vertical slide 38 to its lower position, the upper pawl 24 will engage in an uper link of the chain 11, thus causing the carriage E to move in the direction of travel of the chain in the upper channel 19. By forcing the vertical slide 38 upward, the upper pawl 24 will disengage the chain in the upper channel 19 and at the same time the lower pawl 25 will engage the chain 11 in the lower channel 20, thus imparting motion to the carriage E in the direction of travel of the chain 11 in its lower channel 20.

Suitable means to maintain the vertical slide 38 in either the upper or lower position may be provided. Preferably pressure is applied to the lower or upper side, respectively, of a triangular cam 39 which is rigidly secured to the back of the vertical slide 38. Such pressure is exerted by a roller 40 rotatably mounted on the end of a horizontally slidable member 41 in a housing 42 and urged toward the cam 39 by a spring 43. It is apparent that the position of the vertical slide 38 is dependent on the relative positions of the cam 39 and the roller 40. The spring 43 and slidable member 41 enclosed in housing 42 are adapted to be moved as a unit vertically along the rear of the carriage E. A projection 44 is rigidly mounted on the inner end of the housing 42 so that when the vertical position of the projection 44 is changed, the vertical position of the housing 42, and therefore the position of the roller 40 will likewise be changed. In Fig. 4, the projection 44 is in its lower position. As shown, roller 40 rests against the bottom of the cam 39 and holds the vertical slide 38 in its upper position thus engaging the lower finger 25 in a lower link of the chain 11. When the projection 44 is raised, the housing 42 is likewise raised, and the roller 40 shifted thereby to the opposite or upper side of the cam 39. This forces the vertical slide 38 to the down position which disengages the lower finger 25 and engages the upper finger 24 with the chain. To raise and lower the projection 44, trips or cams 45 and 46 may be bolted on the track member 14 at predetermined points in the path of said projection. Thus, as the carriage E travels along the frame in one direction during the cutting operation, the projection 44 will strike the cam 45 having an upwardly directed cam surface, thereby reversing the direction of travel of the carriage E and therefore the left-hand cutting unit. The cam 46 has a downwardly inclined surface that will shift the projection 44 downward.

The blowpipe B, which includes a cutting nozzle N and a tubular body 47 is slidably mounted in the blowpipe holder 16. The blowpipe holder 16 is rigidly secured to the lower end of an arm 48 which depends from the bottom of the carriage E. An extension rod 49 is adjustably telescoped into the upper end of the blowpipe body 47 and is provided, on its upper end, with a roller 50 which follows the contour of the templet 10 during the cutting operation. The end of the cutting nozzle N is maintained at the proper distance from the surface of the article being cut as the blowpipe B traverses said article, by the support exerted on the roller 50 by the templet 10. The templet 10 may be of any desired shape corresponding to the contour of the article being cut. When a round bar is cut the templet has the form of an arc centered at the axis of the bar. As the carriage E travels across the frame during the cutting operation, the roller 50 will follow the templet 10 and thus raise and lower the blowpipe B as it moves across the work.

The rod 49 may be held in any desired position in the blowpipe body 47 by a clamp screw 51 mounted on a split section 52 of the blowpipe body. To permit adjusting the cutting nozzle N to its proper distance from the work, at the start of the cut, a rack 53 (Fig. 4) is provided on one side of the blowpipe body 47 which meshes with a pinion gear suitably mounted within the blowpipe holder 16 and not shown in the interests of clearness of the drawings. The pinion is secured to the shaft of a crank 54 which may be rotated to adjust the blowpipe vertically. A spring 55 surrounds the blowpipe body 47 to maintain a downward tension on the body. The spring may be adjusted to any desired degree of tension by a collar 56, the position of which along the body 47 may be varied by an adjusting screw 57.

The preheating and cutting gases may be conducted to the blowpipe B by flexible tubing 58, common ends of which are suitably connected to gas inlets in the side of the blowpipe body 47 and the other ends of which are connected to gas supply outlets provided on a central support 59. The support 59 is mounted on the top of the frame member 17 and also serves as a means for lifting the apparatus if it is to be placed into position by means of a chain or similar hoist.

The embodiment of the invention herein described is particularly adapted for cutting hot billets, the heat of which is sufficient to ignite the preheating and cutting gases without external means. However, a pilot flame may readily be affixed to the apparatus so that the gases will automatically ignite when they are brought into contact with said flame.

At the start of the cut, assuming that the apparatus is clamped on a round billet W, the temperature of which is sufficient to ignite the blowpipe gases, the blowpipes B and B' are adjusted to their correct distance from the work by loosening the screws 51 and 51' and turning the cranks 54 and 54' until the desired adjustment of the cutting nozzles N and N' is obtained. The vertical slides 38 and 38' are shifted to the positions necessary to impart the correct inward direction of travel to the carriages E and E' and the valves (not shown) controlling the flow of preheating gases to the blowpipe through conduits 58 are opened. After a short delay to effect the preheating of spots on the sides of the billet W, the cutting oxygen is turned on and at the same time the motor M is energized and both cutting units U and U' are thereby caused to move simultaneously across the work toward each other. As the cut progresses, that is, as the blowpipe nozzles N and N' traverse the work, the upward force exerted by the templet on the under side of the rollers 50 and 50' slowly lifts the blowpipes B and B', respectively, against the downward pressure of the springs 55 and 55', and causes the angular position of each blowpipe axis to change continuously during their arcuate travel. The cutting operation continues until the carriage E' of the right-hand cutting unit U' reaches a predetermined point in its travel close to the vertical center line of the billet, at which time it is automatically, by the engagement of cam 45 with projection 44 as previously described, reversed and returned to its starting position. In the meantime, the left-hand cutting unit U is carried past the vertical axis of the work and completes the cut. The gases are then shut off. The left-hand cutting unit U may be manually returned to its original position after the completion of the cut.

Although the particular embodiment of the apparatus described herein comprises two cutting blowpipes, it is obvious that the apparatus may very easily be adapted to cut using only one cutting blowpipe. Furthermore, the apparatus has been described in connection with the cutting of substantially round billets or bars but it can be seen that the invention is not so limited and may readily be adapted to the cutting of other billet or bar shapes. For example, when rectangular bars are to be cut with an upper surface horizontal, the templet 10 should be substantially straight to maintain the nozzles at a uniform distance from the surface of the work. When cutting rectangular bars, it may be desirable to maintain the axis of the blowpipes vertical and in such case the track 14, 15 should also be straight and horizontal. It will be evident that the curvature of the track controls the angular motion of the blowpipes while the curvature or shape of the templet controls the paths of the ends of the nozzles and by suitably arranging these shapes the apparatus can be arranged to cut bars having a large variety of cross-sectional shapes.

Cutting hot billets with two simultaneously operated blowpipes provides further advantages. For example, when cutting hot round billets with one blowpipe, slag will be found to accumulate on the underside during the last half of the cut. This is because the billet is cylindrical in shape and the underside curves upward on the last half of the cut. This upward curvature will cause the molten slag to flow back over the lower edge of the kerf. Such accumulation of slag on either end of a billet will interfere with the proper further working of the billet. Very little slag has been found to accumulate on the first half of the cut due to the downward slope. Therefore, by using two blowpipes and starting the cuts diametrically opposite each other, each cut will progress toward the center of the billet and the slag accumulation on the bottom will be negligible.

This application is a division of application Serial No. 303,188, filed November 7, 1939, for Method and apparatus for cutting ferrous metal bar stock.

I claim:

1. A method of cutting solid metal stock which comprises heating a portion of said stock to its ignition temperature, directing a jet of oxidizing gas against said heated portion to form a kerf extending therethrough, and progressively advancing said jet through the uncut metal at the entrant portion of said kerf at a faster rate than through the uncut metal at the emergent portion thereof, the longitudinal axis of said jet moving about a point outside of the perimeter of said stock and spaced from the center of said stock in the plane of movement of said jet.

2. A method of cutting solid metal stock by means of a gas-cutting blowpipe which comprises heating a portion of said stock to its ignition temperature, directing a jet of oxidizing gas against said heated portion to form a kerf extending therethrough, and progressively advancing said jet through the uncut metal at the entrant portion of the kerf at a faster rate than through the uncut metal at the emergent portion thereof.

3. A method of cutting solid metal stock of similar width and thickness which comprises heating at least a portion of said stock to its ignition temperature, directing a jet of oxidizing gas against said heated portion to form a kerf extending through said stock, progressively advancing said jet and said kerf across the stock, and continuously changing the angular relation between the axis of the jet and a vertical plane through the longitudinal axis of said stock during the advance of the jet for advancing said jet through the uncut metal at the entrant portion of the kerf at a faster rate than through the uncut metal at the emergent portion thereof.

4. A method of cutting bar stock of similar width and thickness which comprises heating at least a portion of said stock to the ignition temperature; directing a stream of oxidizing gas from a nozzle against said heated stock to form a kerf therethrough; progressively advancing said stream transversely of said stock and in a plane transverse to the longitudinal axis thereof, while maintaining a substantially constant distance between said nozzle and the surface of said stock; and during such transverse movement, varying the angle between the successive positions of the axis of said stream and the initial position of such stream axis with respect to said stock, said angle variation being such that said stream is advanced at a faster rate at the entrant portion of the kerf than at the emergent portion of the kerf.

5. In a process of cutting solid metal stock which comprises directing a jet of oxidizing gas from a nozzle onto a portion of the stock heated to its ignition temperature and progressively moving the jet to form a kerf extending through the stock, the improvement which comprises moving said jet across the stock at a faster rate at the entrant portion of the kerf than at the emergent portion, while maintaining a substantially constant distance between said nozzle and the surface of said stock, the longitudinal axis of said jet moving about a point spaced a substantial distance from the center of said stock in the plane of movement of said jet.

6. A method of cutting a round bar which comprises heating at least a portion of said bar at one side thereof to the ignition temperature; directing a stream of oxidizing gas from a nozzle against said heated portion to form a kerf through said bar; progressively advancing said stream across said bar in a plane transverse of the longitudinal axis thereof and during such transverse movement, constantly varying the successive angular relation of the axis of said stream to move said stream across the bar at a faster rate at the entrant portion of the kerf than at the emergent portion in a manner such that the axis of said stream intersects the axis of said bar when the stream has advanced halfway across the bar, and so that the other successive positions of the axis of said stream make acute angles in said plane with such halfway position, which angles are of increasing value the greater the distance the nozzle is away from the halfway position.

7. A method of cutting metal stock which comprises simultaneously directing at least two streams of oxidizing gas generally downwardly against surface portions on opposite sides of said stock to form kerfs therethrough, the metal to which said streams are applied being at an ignition temperature; progressively advancing said streams toward each other in a plane transverse to the longitudinal axis of said stock until the kerfs produced by said streams substantially meet in parallel relation; and during the cutting continuously changing the angular relation between the longitudinal axes of said jets by moving the longitudinal axes of said jets toward each other about a common point located below the longitudinal axis of said stock.

8. A method of cutting metal stock which comprises simultaneously directing at least two streams of oxidizing gas generally downwardly against surface portions on opposite sides of said stock to form kerfs therethrough, the metal to which said streams are applied being at an ignition temperature; progressively advancing said streams at substantially the same rate toward each other in a plane transverse to the longitudinal axis of said stock, the longitudinal axes of said streams moving about a common point outside of the perimeter of said stock; interrupting the advance of one of said streams; and continuing the advance of the other of said streams until the kerf produced thereby meets the kerf made by the stream which was interrupted.

9. A method of cutting metal stock which comprises simultaneously directing at least two streams of oxidizing gas generally downwardly against surface portions on opposite sides of said stock to form kerfs therethrough, the metal to which said streams are applied being at an ignition temperature; progressively advancing said streams toward each other in a plane transverse to the longitudinal axis of said stock until the kerfs produced by said streams substantially meet in parallel relation, and during the cutting continuously changing the angular relation between the axes of said jets by moving the longitudinal axes of said jets toward each other about a common point located below the longitudinal axis of said stock; interrupting the advance of one of said streams; and continuing the advance of the other of said streams until the kerf produced thereby meets the kerf made by the stream which was interrupted.

10. A method of cutting metal stock which comprises simultaneously directing at least two streams of oxidizing gas against surface portions on opposite sides of said stock to form kerfs therethrough, the metal to which said streams are applied being at an ignition temperature; the initial angular relation of the longitudinal axes of said streams being sufficient to include said stock between said streams; progressively advancing said streams toward each other in a plane transverse to the longitudinal axis of said stock until the kerfs produced by said streams substantially meet in parallel relation; and during the cutting, continuously decreasing the angular relation between the axes of said jets so as to form the entrant portions of said kerfs at a faster rate than the emergent portions thereof.

11. Apparatus for cutting metal stock which comprises two cutting blowpipes adapted to direct oxidizing gas streams simultaneously and generally downwardly against surface portions on opposite sides of said stock; and mechanism for progressively advancing said blowpipes across said stock toward each other from such opposite sides and above said stock in a plane transverse to the longitudinal axis of said stock to cut said stock inwardly from its opposite sides at the same time, said mechanism including a single driven member, means connecting said member to each of said blowpipes for moving them in opposite directions at the same time to cut said stock from its opposite sides, and means for continuously changing the angular relation between the longitudinal axes of said blowpipes about a common point located below said axis during the cutting.

12. Apparatus for cutting metal stock which comprises two blowpipes adapted to direct oxidizing gas streams simultaneously against surface portions on opposite sides of said stock; and mechanism for progressively advancing said blowpipes toward each other in a plane transverse to the longitudinal axis of said stock so that said streams advance at a faster rate through the kerf entrant portions than through their emergent portions, said mechanism including means for interrupting the advance of one of said blowpipes at a predetermined point, and means for continuing the advance of the other of said blowpipes at least until the kerfs produced meet.

13. Apparatus for cutting metal stock which comprises two blowpipes adapted to direct oxidizing gas streams simultaneously against surface portions on opposite sides of said stock; and mechanism for progressively advancing said blowpipes toward each other in a plane transverse to the longitudinal axis of said stock, said mechanism including means for continuously changing the angular relation between said blowpipes during the cutting; said mechanism also including means for interrupting the advance of one of said blowpipes at a predetermined point and means for continuing the advance of the other of said blowpipes at least until the kerfs produced meet.

14. Apparatus for cutting metal bar stock which comprises a frame having a curved track disposed above and transversely of said stock; the center of curvature of said track being spaced below said stock; a carriage movable along said track; means for propelling said carriage along said track; a gas-cutting blowpipe; means on said carriage for adjustably supporting said blowpipe in a position to direct a stream of gas against said stock; and means on said frame for maintaining said blowpipe at a predetermined substantially constant distance from the surface of said stock when said carriage with said blowpipe thereon is moved along the track.

15. Apparatus for cutting metal bar stock which comprises a frame having a track disposed transversely of said stock; a carriage movable along said track; means for propelling said carriage along said track; a gas-cutting blowpipe; means on said carriage for adjustably supporting said blowpipe in a position to direct a stream of gas against said stock; said track being not parallel to the surface of said stock operated upon and having such shape that the angular relation of said blowpipe with respect to its initial position is constantly changed during movement of said carriage along the track; said track having a center of curvature located on the side of said stock opposite that across which said blowpipe moves.

16. Apparatus for cutting metal bar stock which comprises a frame having a track disposed transversely of said stock; a carriage movable along said track; means for propelling said carriage along said track; a gas-cutting blowpipe; means on said carriage for adjustably supporting said blowpipe in a position to direct a stream of gas against said stock; said track being not parallel to the surface of said stock operated upon and having such shape that the angular relation of said blowpipe with repsect to its initial position is constantly changed during movement of said carriage along the track; a templet supported by said frame and having a cam surface substantially equidistant from the surface of said stock operated upon, and means connected to said blowpipe and contacting said cam surface for maintaining said blowpipe at a predetermined distance from the surface of said stock during the movement of said carriage.

17. In a blowpipe apparatus for severing metal bar stock the combination of a frame; a track disposed transversely of said stock and supported by said frame; a carriage movably mounted on said track; means for propelling said carriage along said track; a blowpipe; means secured to said carriage for supporting said blowpipe in a position to direct gas against said stock; and means including said track for continuously changing the angular position of said blowpipe with respect to a transverse axis of said stock during the cutting operation.

18. In a blowpipe apparatus the combination of a frame, including a longitudinal channel and track thereon; a carriage movably mounted to travel along said track; means, including an endless chain having both runs thereof guided along said channel, to impart progressive motion to said carriage; means for driving said chain; means secured to said carriage for adjustably supporting a blowpipe; a slide on said carriage adjustable to engage either run of said chain for propelling said carriage in either direction; spring means for maintaining said slide in engagement with a selected run of said chain when said slide is shifted out of engagement with the other run of said chain; and means including a cam secured to said frame for shifting said slide out of engagement with one run of said chain, causing said spring means to move said slide into engagement with the other run of said chain at a desired point automatically to reverse the direction of movement of said carriage.

19. Blowpipe apparatus for cutting elongated metal stock, which comprises a pair of blowpipes adapted to direct oxidizing gas streams simultaneously against surface portions on opposite sides of said stock to produce coplanar kerfs therein; and mechanism for progressively advancing said blowpipes toward each other in a plane transverse to the length of said stock; said mechanism including an upper member supporting a track adapted to be disposed above said stock and to extend transversely of the length of said stock; cutting units each including a carriage movably mounted to travel along said track and means on said carriage for supporting one of the blowpipes of said pair; rotary supporting members journaled on opposite end portions of said track supporting member; endless flexible means passing over said rotary supporting members with the runs thereof substantially parallel to said track for moving said units to propel one of said blowpipes partly across said stock from an initial position at one side of said stock and to propel the other of said blowpipes along a course to complete the kerf made by the first blowpipe; motor means for driving said rotary supporting means and thereby driving said endless flexible means; said mechanism including means for interrupting the advance of one of said blowpipes at a predetermined point, and means for continuing the advance of the other of said blowpipes at least until the kerfs produced meet.

20. In a blowpipe apparatus for cutting elongated metal stock, the combination of an upper member supporting a track adapted to be disposed above said stock and to extend transversely of the length of said stock; right-hand and left-hand cutting units each including a blowpipe and a carriage movably mounted to travel along said track; said blowpipes being adapted to direct oxidizing gas streams simultaneously against surface portions on opposite sides of said stock to produce coplanar kerfs therein; mechanism for moving each of said units in one direction during a cutting operation and then in the opposite direction back to the starting position of said units; said mechanism comprising rotary supporting members journaled on opposite end portions of said track supporting member; endless flexible element means for moving said units and passing over said rotary supporting member; motor means for driving said rotary supporting means and thereby driving said endless flexible element means; and control mechanism for reversing the movement of one unit before the completion of the cutting operation of the blowpipe of the other unit.

GEORGE H. SMITH.